(No Model.)
J. B. AMMONS.
COTTON CHOPPER.
No. 364,699.　　　　Patented June 14, 1887.
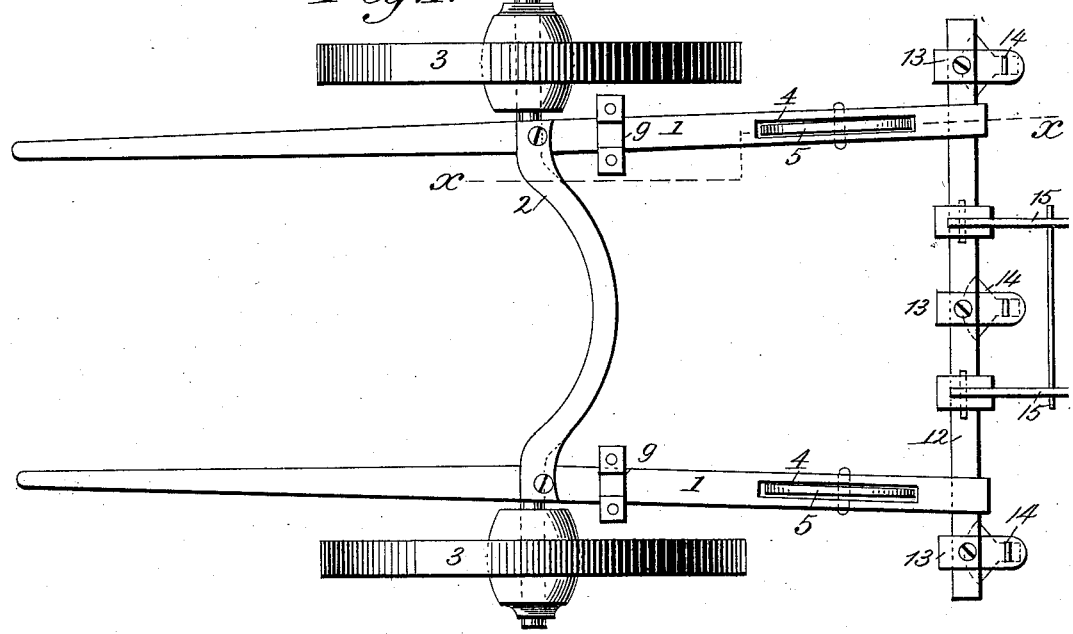
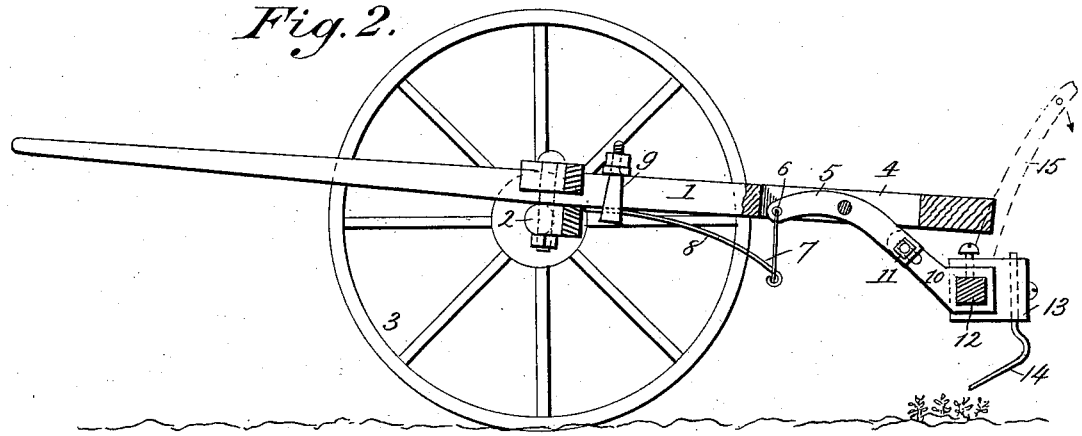
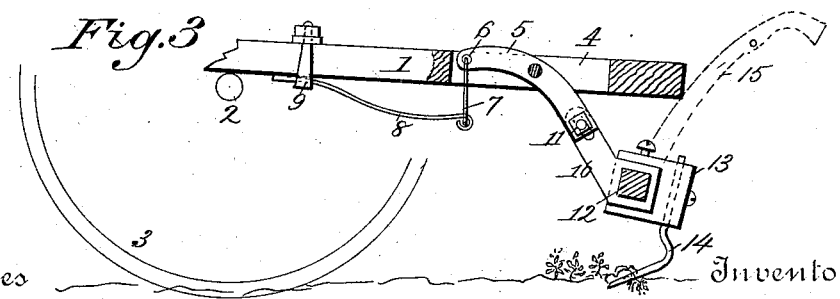
Witnesses
F. H. Schott
Newton Crawford
Inventor
John B. Ammons
By his Attorney
W. A. Ruff

United States Patent Office.

JOHN B. AMMONS, OF CAMDEN, ASSIGNOR OF ONE-THIRD TO GEORGE W. REARDON, OF SUMTER, SOUTH CAROLINA.

COTTON-CHOPPER.

SPECIFICATION forming part of Letters Patent No. 364,699, dated June 14, 1887.

Application filed October 20, 1886. Serial No. 216,735. (No model.)

*To all whom it may concern:*

Be it known that I, JOHN B. AMMONS, of Camden, in the county of Kershaw and State of South Carolina, have invented certain new and useful Improvements in Cotton-Choppers; and I do hereby declare the following to be a full, clear, and exact description of the invention, such as will enable others skilled in the art to which it appertains to make and use the same.

My invention relates to an improvement in cotton-choppers, the object of which is to provide a machine of this character by means of which portions of the rows of growing cotton-stalks may be cut or chopped away, leaving at intervals the desired quantity of growing stalks.

A further object is to provide means of the above character which shall be simple and economical in construction and durable and efficient in use; and with these ends in view my invention consists in the certain features of construction and combinations of parts, as will be hereinafter fully described, and pointed out in the claims.

In the accompanying drawings, Figure 1 is a plan view of the machine. Figs. 2 and 3 are sectional views thereof on lines *x x* of Fig. 1, in which are shown the choppers in elevated and lowered adjustment, respectively.

The frame of the machine consists of longitudinal beams 1, supported on axle 2, the latter having at its outer ends wheels 3. The rear ends of the beams 1 are provided with the elongated slots 4, in which are pivoted the curved arms 5, the upper ends of which are provided with perforations 6, to which are secured the ends of the connecting-rods 7, the opposite ends thereof being secured to the free ends of the band-springs 8, the said springs being secured to the beams 1 by means of the clips 9. To the lower ends of the arms 5 are secured the adjustable arms 10, by means of the square bolts 11, which pass through suitable perforations in the arms 5 and register with the elongated slots formed in the upper ends of the arms 10, whereby the chopping mechanism may be conveniently adjusted.

To the free ends of the arms 10 is suitably secured the bar 12, to which is secured at preferred intervals the blocks 13, carrying the chopper-knives 14. The blocks and knives may be of any desired number, and, if preferred, the blocks may be dispensed with and the knives otherwise secured to the bar.

The bar 12 is actuated downwardly by means of the handles 15, which are secured thereto in the manner shown.

Having thus fully described the construction of my machine, its operation is as follows: The springs 8 effect a downward pressure on the inner ends of the arms 5, which serve to elevate the bar 12 and automatically hold the chopper-knives clear of the ground. When the machine is started, the bar 12 is depressed by the operator pressing upon the handles 15, which brings the knives in contact with the stalks.

Having fully described my invention, what I claim as new, and desire to secure by Letters Patent, is—

1. In a cotton-chopper, the combination, with beams, of arms centrally pivoted thereto, and bar-carrying arms connected to the lower ends thereof, the latter being adjustably secured to the pivoted arms, substantially as set forth.

2. In a cotton-chopper, the combination, with beams and slots formed therein, of arms 5, pivoted in said slots, arms 10, having elongated slots in their upper ends adjustably connected with arms 5, a bar secured to the lower ends of arms 10 and carrying chopper-knives, and springs for automatically holding the chopper-knives in elevated adjustment, substantially as described.

In testimony whereof I have signed this specification in the presence of two subscribing witnesses.

JOHN B. AMMONS.

Witnesses:
P. H. NELSON,
D. R. WILLIAMS, Jr.